May 24, 1927.
C. H. JOHNSON
DIRECTION INDICATOR
Filed Sept. 16, 1926
1,630,015
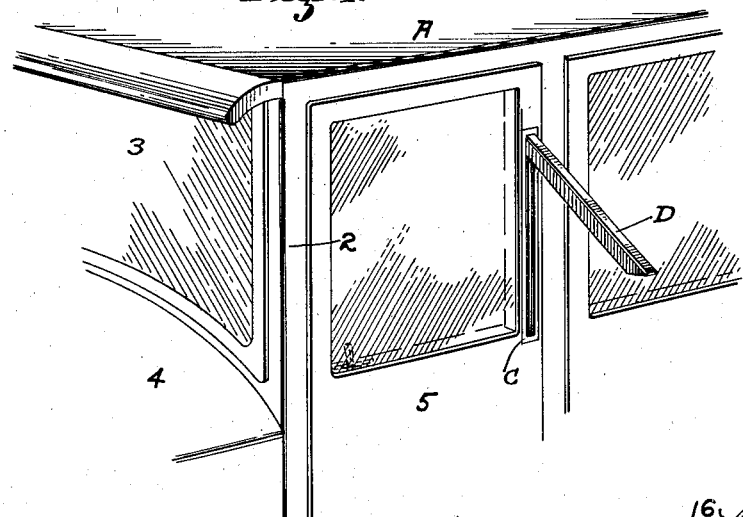
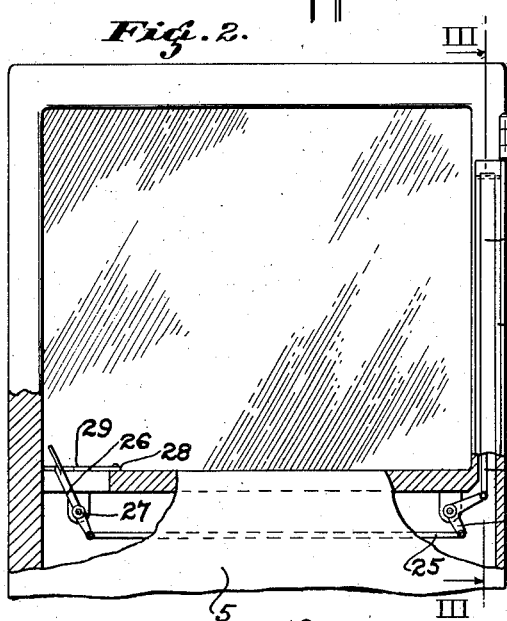
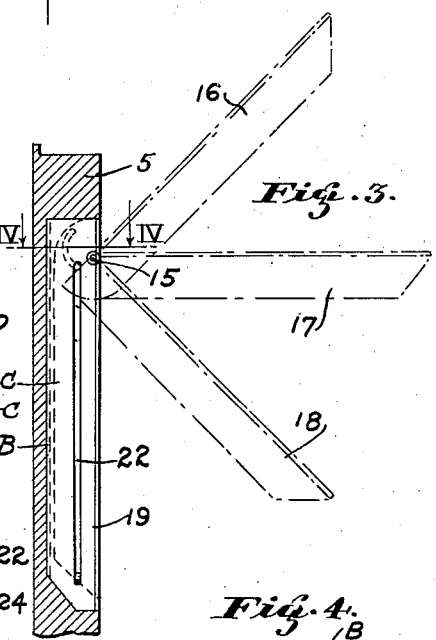
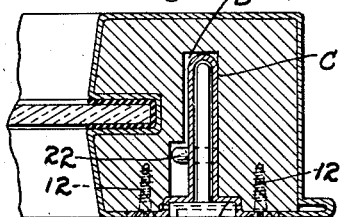
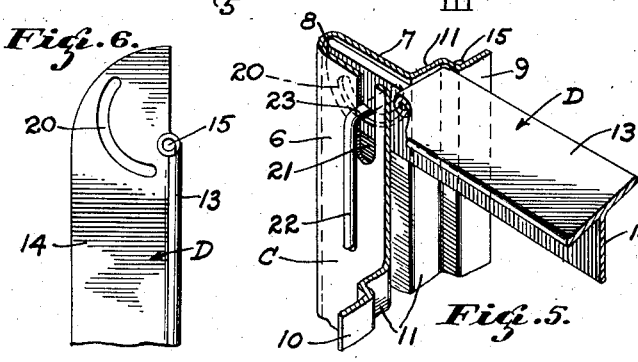
INVENTOR.
Charles H. Johnson.
BY
Townsend, Loftus & Abbett
ATTORNEYS.

Patented May 24, 1927.

1,630,015

UNITED STATES PATENT OFFICE.

CHARLES H. JOHNSON, OF SACRAMENTO, CALIFORNIA.

DIRECTION INDICATOR.

Application filed September 16, 1926. Serial No. 135,719.

This invention relates to a direction indicator or signalling apparatus especially adapted for automobiles for indicating to drivers of other automobiles or to pedestrians the direction in which the automobile is to turn or the fact that the automobile is to be slowed down or stopped, the apparatus being of that type in which an arrow arm or other indicator mounted at the side of the car can be swung to or from an indicating position.

The object of the present invention is to generally improve and simplify the construction and operation of an apparatus of the character described so as to render such apparatus reliable and efficient in use, comparatively simple and inexpensive to manufacture, easy to install and so designed as to be under convenient control of the driver. A more specific object of the invention is to provide an apparatus of this character which is especially adapted for installation in closed cars such as sedans, coupés, coaches and the like and particularly in the door or frame thereof; to provide an apparatus of this character which will be invisible when not in use and which will appear to form a part of the door or frame, when installed and further to provide means whereby the signal or indicating arm may be operated from the interior of the car.

One form which the invention may assume is shown by way of illustration in the accompanying drawings in which:

Figure 1 is a perspective view of the portion of an automobile top showing the application of the invention to the front door, Figure 2 is an enlarged side elevation of the door partly broken away and partly in section, Figure 3 is a vertical section of the door taken on the line III—III of Figure 2, Figure 4 is an enlarged cross section of the door frame taken on the line IV—IV of Figure 3, Figure 5 is a perspective view of a portion of the direction indicating arm and the housing in which it is pivotally mounted, said view showing only a portion of the housing and said housing being partly broken away and partly in section, Figure 6 is an enlarged side elevation of the upper end of the direction indicating arm.

Referring to the drawings in detail and particularly to Figures 1, 2 and 3, A indicates in general the top of an automobile, 2 the side frame posts supporting the top 3, the wind-shield 4, the cowl and 5 the front door of a closed type of automobile such as a sedan or the like. The direction indicating or signalling apparatus forming the subject matter of the present application is as previously stated, particularly adapted for installation in the door or frame of an automobile, such installation being accomplished by slotting the door frame and inserting a housing in the slotted portion, which housing serves as a support and a container for the direction indicating arrow or arm.

In the present instance, the drawings illustrate the application of a signalling apparatus to the front door and the frame of the door is, accordingly, vertically slotted as indicated at B, to receive the housing C of the signalling apparatus and the direction indicating arrow or arm D supported thereby. The housing may be constructed of sheet metal or the like and its cross section, as shown in Figures 4 and 5 is substantially T-shaped, that is, a piece of sheet metal is bent to form a pair of side members 6 and 7 which are interspaced as indicated at 8. The outer ends of the side members 6 and 7 are turned at right angles to form face flanges 9 and 10 and the face flanges are, in turn, slightly recessed as indicated at 11, for the purpose hereinafter to be described.

The casing extends from end to end of the slot and it is secured therein by passing screws 12 or the like through the face flanges into the woodwork. The direction indicating arm is also T-shaped in cross section as shown in Figure 5. The head of the T section or plate indicated at 13, has a width equal to the recess 11 formed in the face plates and has a thickness equal to the recess, so that when the direction indicating arm is swung into the housing a flush surface will be presented by the plate 13 and the face flanges 9 and 10.

The leg of the T section, indicated at 14, forms the indicating arrow or arm. This arm is pivotally mounted at its upper end on the pin 15 and the arm may swing this pin to any of the dotted line positions indicated at 16, 17 and 18 or the inoperative position indicated at 19, which is assumed when the arm is swung downwardly into the casing. The upper end of the arm is provided with arcuated slots 21 as shown in Figures 3, 5 and 6 and the upper end of the side plate 6 is vertically slotted as indicated at 21.

An actuating rod 22 lies exterior of the side plate 6 and its upper end is bent at right angles as indicated at 23 so as to project through the slots 21 and 20. The lower end of the actuating arm is connected with a pivotally mounted bell-crank 24 and this bell-crank is, in turn, connected through a link 25 with an operating lever 26 which is pivotally mounted as at 27. The upper end of the lever projects through the sill of the door and a slotted plate 28. This plate is provided with notches, such as shown at 29, with which the lever may be engaged or secured to the link in predetermined positions.

The operating lever 26 is mounted within convenient reach of the driver and when he desires to operate the signalling apparatus, he merely grasps the lever and pulls it into engagement with one or more of the latches 29 when movement of the lever is transmitted through link 25, bell-crank 24 and operating rod 22, the movement of the rod being in a downward direction. Such movement is transmitted through the right angular bent end 23 to exert a downward pull on the upper end of the signalling arm and may thus be swung to assume any one of the positions shown at 16, 17 and 18. These positions correspond with the standard hand or arm systems now in use and indicates that the driver intends to turn to the right or left as the case may be or that he intends to slow down or stop, a right hand turn being indicated when the arm assumes the position shown at 16, a left hand turn when the arm assumes the position shown at 17 and when slowing down or stopping the position indicated at 18, is assumed.

Whenever possible the housing should form a part of the door frame or post, where this is not possible, the housing in which the signal operates may be separate from the frame or so made that in case a separate frame is employed, it can be spot-heated or riveted thereto. In case of a wooden frame it is attached by screws or bolts, as previously stated. The housing is, in reality, U-shaped in cross section so as to provide the greatest possible strength. This is important where the door frame is made of wood, as a slot cut into it will tend to weaken the frame, but when the housing is U-shaped and securely fastened, as here illustrated, it will materially re-enforce and strengthen the frame. Another important feature is the fact that the entire signalling apparatus is substantially invisible when not in use, as the casing and the direction indicating arm lie flush with the surface of the door frame and may be painted the same color.

In this manner, the general appearance of the car is in no manner affected. This structure also insures against rain and dust and avoids all projections except when the signal is displayed.

While certain features of the present invention have been more or less specifically illustrated it is understood that varying changes may be resorted to within the scope of the appended claims. Similarly various materials and finishes of the several parts employed may be such as the manufacturer may decide or varying conditions or uses may demand.

Having thus described my invention, what I claim and desire to secure by Letters Patent is:—

1. The combination with a door of an automobile, said door having an elongated slot formed in its outer surface, of a housing adapted to be inserted in the slot, said housing extending from end to end of the slot and being U-shaped in cross section, a pair of face flanges on the housing, one on each side thereof and extending from end to end of the slot, said flanges adapted to lie flush with the outer surface of the door, means whereby the housing is secured in the slot, said housing being open in its outer surface from end to end, an arm pivoted at its upper end in the housing and adapted to be swung into and out of the housing, a cover plate on the arm forming a closure for the housing when the arm is swung into the housing, said face flanges being recessed to receive the cover plate and thereby permitting the cover plate to lie flush with the face flanges in the upper surface of the door.

2. The combination with a door of an automobile, said door having an elongated slot formed in its outer surface of a housing adapted to be inserted in the slot and secured therein, said housing having an elongated opening formed in its outer surface, an arm pivoted at its upper end in the housing and adapted to be swung into and out of the housing, an extension on the arm above the pivot, said extension having an arcuated slot formed therein eccentrically positioned with relation to the pivot, a longitudinally movable rod having a projection formed at one end and extending through the slotted extension and adapted to impart a swinging movement to the arm about its pivot and cover plate on the arm forming a closure for the housing opening when the arm is swung into the housing.

CHARLES H. JOHNSON.